United States Patent Office 3,435,176
Patented Mar. 25, 1969

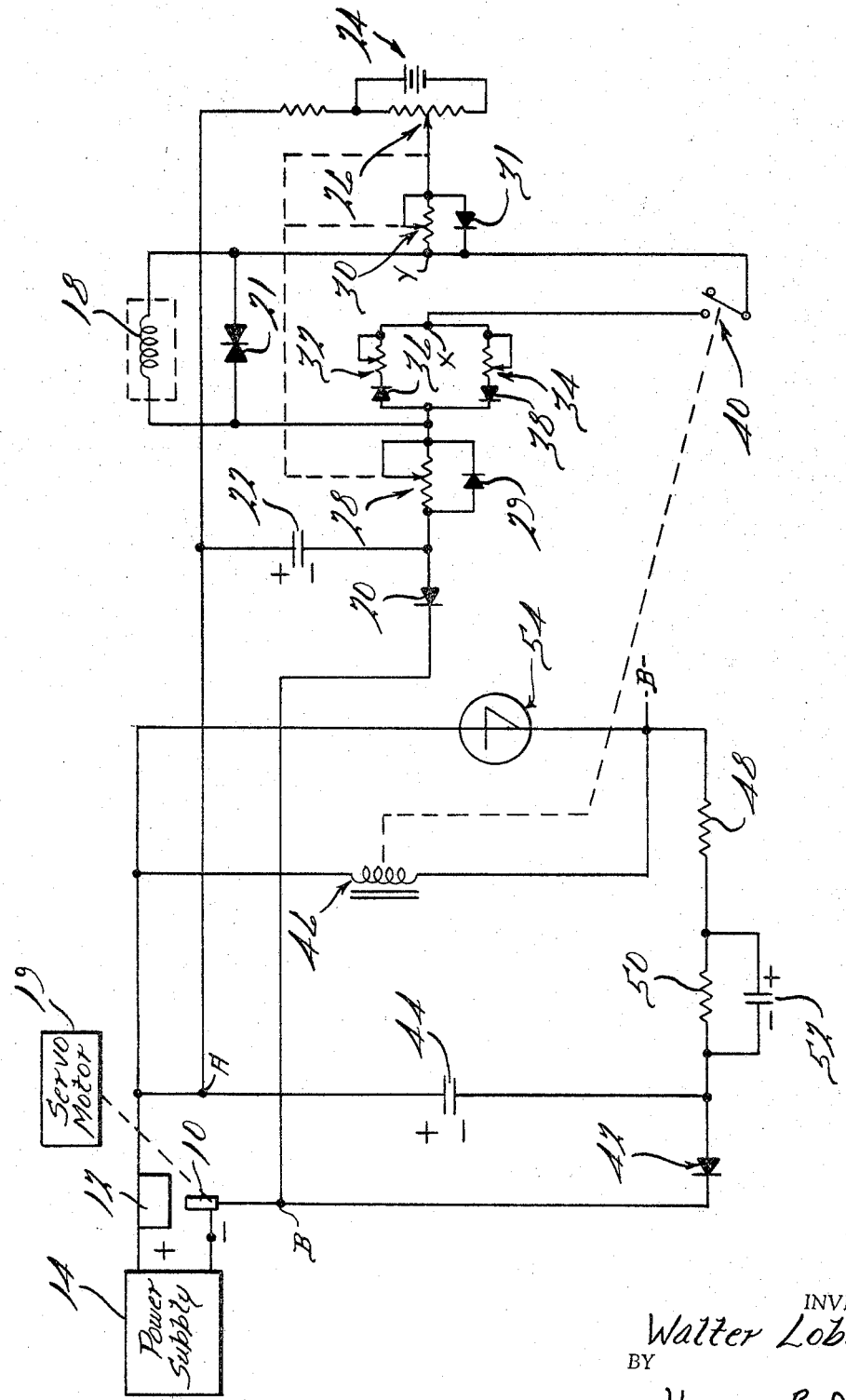

3,435,176
VARIABLE VELOCITY SERVO CONTROL CIRCUIT FOR ELECTRICAL DISCHARGE MACHINING APPARATUS
Walter Lobur, Clawson, Mich., assignor, by mesne assignments, to Elox Inc., Troy, Mich., a corporation of Delaware
Filed Mar. 9, 1966, Ser. No. 532,974
Int. Cl. B23k 9/10
U.S. Cl. 219—69                        6 Claims

ABSTRACT OF THE DISCLOSURE

A servo feed control circuit with a sensing circuit for responding to gap open circuit condition and prolonged gap short circuit condition and increasing the magnitude of control voltage to initiate a higher velocity operation of the servo feed during those conditions.

---

A problem encountered in servo feed systems for electrical discharge machines is that normal control settings for optimum cutting conditions involve a relatively low servo feed velocity. This necessarily involves a relatively long approach time on initial downfeed.

It is an object of this invention to provide a new and improved servo system for electrical discharge machining in which, during initial downfeed or approach with gap open circuit, a relatively high feed velocity is maintained, which velocity is reduced upon a predetermined voltage drop across the gap to provide normal servo feed operation during normal cutting operation.

It is an additional object of this invention to provide a new and improved servo feed circuit for electrical discharge machining in which, responsive to prolonged gap short circuit condition, rapid withdrawal is provided.

It is a further object of this invention to provide a new and improved servo feed circuit for electrical discharge machining in which both high velocity approach and high velocity withdrawal are accomplished at the appropriate stages to provide optimum machining.

It is a further object of this invention to provide a new and improved servo feed circuit for electrical machining in which both high velocity approach and high velocity withdrawal are accomplished at the appropriate stages to provide optimum machining.

My invention, together with its advantages, will be better understood by reference to the accompanying drawing, in which the drawing is a combined schematic and block diagram representative of the invention.

With more particular reference to the drawing, the tool electrode 10 is normally advanced toward the electrically conductive workpiece 12 with a dielectric coolant flow being maintained in the gap. Power supply 14 is utilized to furnish machining pulses to the gap and to provide discrete electrical discharges thereacross to remove particles from the workpiece. One example of a power supply suitable for furnishing high frequency machining pulses across the gap is shown and described in Porterfield U.S. Patent 3,089,059, issued May 7, 1963. In order to maintain the gap spacing between electrode 10 and workpiece 12 and to keep this spacing at an optimum during machining, a servo feed control system is employed which, responsive to a gap parameter representative of gap spacing, provides bidirectional current flow through a suitable electrohydraulic valve control coil 18 and electrohydraulic motor 19 to control the backup or downfeed of electrode 10 in a manner well known in the art. While the present invention is incorporated in a system utilizing an electrohydraulic motor, it is not so limited. A sensing network comprising a diode 20 and a capacitor 22 is connected across the machining gap at points A and B. This is a peak voltage sensing network which senses the peak voltages stored across capacitor 22. A reference voltage source 24 is connected across the variable resistance of a potentiometer 26. A pair of rheostats 28, 30 with shunt diodes 29, 31 are connected as shown between the sensing network and the reference voltage. Rheostats 28, 30 and potentiometer 26 are ganged together for operation to preset the gap reference voltage and to vary inversely the series resistances provided by those rheostats in accordance with the magnitude of the gap reference voltage preset. A pair of potentiometers 32, 34 are connectable in parallel with servo coil 18 which potentiometers are used to regulate the up and down velocity of servo operation, respectively. Diodes 36, 38 are connected in series with the adjustable resistances of potentiometers 32, 34, respectively, to provide the required opposite direction current flow paths. An overvoltage protective device-double anode diode 21 is further connected across servo coil 18. To control the changeover between high and normal feed velocities, relay contacts 40 are connected between points X and Y of the circuit.

The control circuit additionally comprises a second sensing network operatively connected to the machining gap for providing an output representative of gap condition. The network comprises a diode 42 and capacitor 44 series connected across the gap. A control means, a relay coil 46, which is operatively associated with and controlling relay contacts 40 is included. Relay coil 46 is operatively connected to capacitor 44 in the sensing network as shown. Connected in series with relay coil 46 are a surge limiting resistor 48 and a parallel RC network including resistor 50 and capacitor 52. To properly initiate the operation of relay coil 46, an electronic breakdown device, in the present instance, four-layer diode 54 is connected in shunt with relay coil 46. By "electronic breakdown device" I mean any electronic device which, responsive to a voltage applied across it in excess of its breakdown voltage value, is triggered sharply conductive. Resistor 50 and capacitor 52 provide lead network voltage to extinguish the four-layer diode. A B minus potential may be connected to four-layer diode 54 as shown to insure its turn off. An important feature is provided by the inclusion of four-layer diode 54. It is operative to provide a broad null range of operation which insures the appropriate activation of relay coil 46. In addition, the phasing of the relay contacts is one promoting the stability of cutting. That is, the contacts are energized during a normal cutting state. The contacts are thus quick to pull in when the relay is energized but slow to drop out when it is deenergized.

Description of operation

When the machining operation is commenced, an open circuit voltage is furnished to the gap by power supply 14 which may be, for example, of the order of 70 volts with the power pulses provided to the gap of a polarity to maintain the electrode 10 negative relative to the workpiece 12. In some machining applications, it may be suitable to utilize the opposite polarity for machining but, with proper phasing of the sensing network and reference voltages the present embodiment of the invention is fully appropriate. During open arc, the voltage presented across the machining gap is of a magnitude sufficient to fire the four-layer diode 54 to render it conductive. During the conduction of four-layer diode 54, current is shunted about relay coil 46 to deenergize it and hold it deenergized. In the deenergized state of relay coil 46, the movable contact of contacts 40 is moved to open circuit to increase the voltage across servo coil 18 which increased voltage provides high velocity approach of electrode 10 toward workpiece 12. When the electrode 10 has moved into close proximity to the workpiece, it may actually contact the workpiece to short circuit the gap. The peak voltage stored across capacitor 44 then drops rapidly. The voltage previously stored across RC network 50, 52 likewise decays but is of sufficient time duration to turn off the four-layer diode by the imposed reverse voltage and render it nonconductive. As normal cutting proceeds, relay 46 will be held in its energized state with the movable contact 40 held in its left-hand position to provide normal servo velocity. During normal cutting conditions in the gap, the voltage stored across capacitor 44 will be of a level sufficient to hold relay 46 closed but of a level insufficient to fire four-layer diode 54. If a prolonged gap short circuit should occur, relay 46 will be dropped out to permit rapid withdrawal between electrode and workpiece. If open circuit condition occurs in the gap, four-layer diode 54 will fire to hold out relay coil 46 to again provide high velocity operation of the servo feed circuit. While the present invention has been illustrated in connection with an electrical discharge machining servo feed apparatus, the invention will be seen not to be limited to this environment but equally applicable to any servo feed system of the electrically operated and closed loop type. The present invention is of particular importance in the general field of electrical machining which field also includes the process of electrochemical machining in which, in a manner similar to electrical discharge machining, metal is removed by an electrical machining process across a machining gap. Electrochemical machining differs from electrical discharge machining in that the power supply is usually steady state current rather than pulsating and the machining fluid used is an electrolyte rather than a dielectric. It will thus be seen that my improved servo control system is one which provides high velocity operation where required, yet permits changeover between high velocity and normal velocity operation without affecting the stability of operation.

I claim:

1. In an apparatus for machining a conductive workpiece by electrical discharge from a power supply across a dielectric coolant filled gap between a tool electrode and said workpiece including a motive means for providing relative movement between said electrode and workpiece, a servo feed system comprising an electrically energized element operatively connected to and controlling the operation of said motive means, means for providing a control signal to said element representative of gap spacing, said signal of a level to provide normal velocity operation of said motive means, and a control switching means operatively connected to said gap and to said element controlling the magnitude of said signal thereto and raising it to provide a shunt path for shunting a portion of said signal about said element responsive to normal gap condition, said switching means operable to disconnect said shunt path to provide high velocity downfeed operation of said motive means responsive to gap open circuit condition.

2. In an apparatus for machining a conductive workpiece by electrical discharge from a power supply across a dielectric coolant filled gap between a tool electrode and said workpiece including a motive means for providing relative movement between said electrode and workpiece, a servo feed system comprising an electrically energized element operatively connected to and controlling the operation of said motive means, means for providing a control signal to said element representative of gap spacing, said signal of a level to provide normal velocity operation of said motive means, and a control switching means operatively connected to said gap and to said element to provide a shunt path for shunting a portion of said signal about said element responsive to normal gap conditions, said switching means operable to disconnect said shunt path to increase the velocity of operation of said motive means responsive to prolonged gap short circuit condition.

3. In an apparatus for machining a conductive workpiece by electrical discharge from a power supply across a dielectric coolant filled gap between a tool electrode and said workpiece including a motive means for providing relative movement between said electrode and workpiece, a servo feed system comprising an electrically energized element operatively connected to and controlling the operation of said motive means, means for providing a control signal of a predetermined level to said element representative of gap spacing, said signal of a level to provide normal velocity operation of said motive means, and a control means, said control means comprising a control coil of a relay operatively connected across said gap, said relay having its contacts operatively connected across said element for increasing current flow therethrough responsive to gap open circuit and prolonged gap short circuit condition.

4. The combination as set forth in claim 3 in which said control means comprises a relay control coil operatively connected across said gap, said coil operatively connected to and controlling a movable relay contact, said contact operatively connected to said element for controlling current flow therethrough responsive to said conditions.

5. In an apparatus for machining a conductive workpiece by electrical discharge from a power supply across a dielectric coolant filled gap between a tool electrode and said workpiece including a motive means for providing relative movement between said electrode and workpiece, a servo feed system comprising an electrically energized element operatively connected to and controlling the operation of said motive means, means for providing a control signal of a predetermined level to said element representative of gap spacing, said signal of a level to provide normal velocity operation of said motive means, and a control means comprising a relay control coil operatively connected across said gap, said coil operatively connected to and controlling a movable relay contact, said contact operatively connected to said element for controlling current flow therethrough to raise said level of said signal to increase the speed of operation of said motive means, and an electronic breakdown device operatively connected across said relay control coil for initiating its operation responsive to gap open circuit condition and prolonged gap short circuit condition.

6. In an apparatus for machining a conductive workpiece by electrical discharge from a power supply across a dielectric coolant filled gap between a tool electrode and said workpiece including a motive means for providing relative movement between said electrode and workpiece, a servo feed system comprising an electrically energized element operatively connected to and controlling the operation of said motive means, means for providing a control signal of a predetermined level to said element representative of gap spacing, said signal of a level to provide normal velocity operation of said motive means, and a control means comprising a relay control coil operatively connected across said gap, said coil operatively connected to and controlling a movable relay contact, said contact operatively connected to said element for controlling current flow therethrough to raise said level of said signal to increase the speed of operation of said motive means, and a four layer diode connected in series with an RC network and across said relay coil for initiating its operation responsive to gap open circuit condition and prolonged gap short circuit condition.

References Cited

UNITED STATES PATENTS 2,939,065    5/1960    Matulaitis.
3,230,412    1/1966    Webb.

RICHARD M. WOOD, *Primary Examiner.*

R. F. STAUBLY, *Assistant Examiner.*

PO-1050
(5/69)

UNITED STATES PATENT OFFICE
CERTIFICATE OF CORRECTION

Patent No. 3,435,176        Dated March 25, 1969

Inventor(s) Walter Lobur

It is certified that error appears in the above-identified patent and that said Letters Patent are hereby corrected as shown below:

In the claims, Claim 1, Column 3, Lines 51 and 52, following the word "element", delete --controlling the magnitude of said signal thereto and raising it--.

SIGNED AND
SEALED
OCT 6 1970

(SEAL)
Attest:

Edward M. Fletcher, Jr.
Attesting Officer

WILLIAM E. SCHUYLER, JR.
Commissioner of Patents